(12) United States Patent
Cormier

(10) Patent No.: US 12,590,870 B2
(45) Date of Patent: Mar. 31, 2026

(54) FLUIDIC NETWORK FOR ASEPTIC SAMPLING

(71) Applicant: Waters Technologies Corporation, Milford, MA (US)

(72) Inventor: Sylvain Gilles Cormier, Mendon, MA (US)

(73) Assignee: Waters Technologies Corporation, Milford, MA (US)

( * ) Notice: Subject to any disclaimer, the term of this patent is extended or adjusted under 35 U.S.C. 154(b) by 273 days.

(21) Appl. No.: 18/311,462

(22) Filed: May 3, 2023

(65) Prior Publication Data

US 2023/0358644 A1     Nov. 9, 2023

Related U.S. Application Data

(60) Provisional application No. 63/340,534, filed on May 11, 2022, provisional application No. 63/339,679, filed on May 9, 2022.

(51) Int. Cl.
*G01N 1/20*          (2006.01)
*G01N 1/22*          (2006.01)

(52) U.S. Cl.
CPC ......... *G01N 1/2035* (2013.01); *G01N 1/2205* (2013.01); *G01N 2001/205* (2013.01)

(58) Field of Classification Search
CPC ............... G01N 1/2035; G01N 1/2205; G01N 2001/205; G01N 30/16; G01N 30/20; G01N 30/40; G01N 1/10; G01N 35/1097
See application file for complete search history.

(56) References Cited

U.S. PATENT DOCUMENTS

| | | | |
|---|---|---|---|
| 3,393,551 A | 7/1968 | Todd et al. | |
| 4,942,770 A | 7/1990 | Seifert et al. | |
| 6,148,657 A | 11/2000 | Satoh et al. | |
| 8,549,934 B2 | 10/2013 | Biksacky | |
| 9,389,151 B2 * | 7/2016 | Newbold | ............... C12M 33/04 |

(Continued)

FOREIGN PATENT DOCUMENTS

| | | |
|---|---|---|
| CA | 3090001 A1 | 8/2019 |
| CN | 111239297 A | 6/2020 |

(Continued)

OTHER PUBLICATIONS

International Preliminary Report on Patentability in PCT/US2023/020790 mailed on Nov. 21, 2024.

(Continued)

*Primary Examiner* — David Z Huang
(74) *Attorney, Agent, or Firm* — Schmeiser, Olsen & Watts LLP

(57) ABSTRACT

Described are a fluidic network and a method for aseptic process sampling. The fluidic network includes a sampling valve, filter, manifold and valve control module. A process sample path in the fluidic network includes one or more valve channels and a filter in fluidic communication with the sampling valve. The sampling valve is configurable in a first valve state to receive a process sample into the process sample path from a process source and configurable in a second valve state in which gas and solvent flows may be provided through the process sample path to clean and dry the process sample path to prepare for acquisition of another process sample.

15 Claims, 5 Drawing Sheets

(56)                    References Cited

U.S. PATENT DOCUMENTS

| 9,442,047 | B2 | 9/2016 | Biksacky |
| 9,499,782 | B2 | 11/2016 | Newbold et al. |
| 10,975,349 | B2 | 4/2021 | Biksacky |
| 2007/0072285 | A1 | 3/2007 | Barringer |
| 2008/0308494 | A1 | 12/2008 | Barringer, Jr. |
| 2009/0050212 | A1* | 2/2009 | Dourdeville .......... G01N 30/20 |
| | | | 137/625.46 |
| 2012/0204626 | A1 | 8/2012 | Davison |

FOREIGN PATENT DOCUMENTS

| EP | 0661537 | B1 | 7/1995 |
| EP | 0892267 | A1 | 1/1999 |

OTHER PUBLICATIONS

International Preliminary Report on Patentability in PCT/US2023/020794 mailed on Nov. 21, 2024.

Restriction Requirement in U.S. Appl. No. 18/311,471 mailed on Apr. 22, 2025.

"The Mast(R) Automated Aseptic Sampling System: FAQs" Lonza, 2020.

International Search Report and Written Opinion in PCT/US2023/020790 mailed on Aug. 17, 2023.

International Search Report and Written Opinion in PCT/US2023/020794 mailed on Sep. 15, 2023.

Non-Final Office Action in U.S. Appl. No. 18/311,471, mailed on Jun. 30, 2025.

Final Office Action in U.S. Appl. No. 18/311,471 mailed on Oct. 6, 2025.

\* cited by examiner

FLUIDIC NETWORK FOR ASEPTIC SAMPLING

RELATED APPLICATIONS

This application claims the benefit of the earlier filing date of U.S. Provisional Patent Application Ser. No. 63/339,679 filed May 9, 2022 and titled "Fluidic Network for Aseptic Sampling" and claims the benefit of the earlier filing date of U.S. Provisional Patent Application Ser. No. 63/340,534 filed May 11, 2022 and titled "Fluidic Network for Aseptic Sampling" the entireties of which are incorporated herein by reference.

FIELD OF THE INVENTION

The disclosed technology relates generally to a fluidic network for bioprocessing sampling applications. More particularly, the technology relates to a fluidic network and method for aseptic process sampling.

BACKGROUND

A bioprocess may require many days for completion and sampling may be desired daily or more frequently to properly monitor and control the process. Bioprocess monitoring generally requires sample clarification to interface to analytical instrumentation. The bioprocess may be monitored for efficiency and to determine the quality of a bioprocess product. In some instances, the monitoring is used for feedback for making process adjustments.

To receive a sample from a bioprocess source, such as a bioreactor, careful procedures should be followed to protect the bioprocess source from contamination. The bioreactor may contain media that supports biological growth of one or more desired product materials. Sampling may include introducing a syringe into the reactor vessel to withdraw a desired volume of sample. This process can introduce contaminants into the reactor if the tip of the syringe was previously in contact with bio-organic material or another contaminant. As a result of the contamination, the desired output of the bioprocess may be adversely affected or terminated. For example, bacteria, viruses, mold or spores that may be unintentionally introduced into the bioreactor by the sampling process may prevent the desired bioprocess from proceeding. Considerable time and effort are generally required to perform conventional aseptic sampling to avoid the problems associated with the introduction of contaminants into the bioreactor.

SUMMARY

In one aspect, a fluidic network for aseptic process sampling includes a sampling valve, a filter, a manifold and a valve control module. The sampling valve has a plurality of ports and a plurality of valve channels and is configurable in at least a first valve state and a second valve state. One of the ports is a process inlet port configured to receive a process sample and another one of the ports is a process outlet port configured to dispense the process sample. The filter is in fluidic communication with the sampling valve. The manifold is configured to supply and control the flows of a plurality of fluids. The manifold has a manifold outlet port to provide a flow of a selected one of the fluids. The manifold outlet port is in fluidic communication with one of the ports of the sampling valve. The valve control module is in communication with the sampling valve and the manifold.

A process sample path is defined between the process inlet port and the process outlet port and includes the filter and at least one of the valve channels. When the sampling valve is in the first valve state, the process sample path is enabled to receive the process sample and, when the sampling valve is in the second state, the flow of the selected one of the fluids from the manifold outlet ports is enabled to pass through the process sample path.

The manifold may be controllable to provide a selected one of a solvent flow and a gas flow to the process sample path. When the sampling valve is in the second valve state and the manifold provides the gas flow, the gas flow is conducted through the process sample path. When the sampling valve is in the second valve state and the manifold provides the solvent flow, the solvent flow is conducted through the process sample path. The gas and solvent flows may be in a reverse direction relative to a flow of the process sample through the process sample path.

The manifold may include a manifold valve having a first inlet port configured to receive a gas flow and a second inlet port configured to receive a first solvent flow and wherein the manifold valve is configurable in a first valve state in which the gas flow is conducted from the first inlet port to the manifold outlet port, a second valve state in which the first solvent flow is conducted from the second inlet port to the manifold outlet port, and a closed valve state in which the first and second inlet ports are fluidically decoupled from the manifold outlet port.

The valve control module may be configured to adjust a period during which at least one of the gas flow and the solvent flow passes through the process sample path.

The sampling valve may be a rotary shear seal valve or a linear shear seal valve. The filter may be formed of a porous material.

In another aspect, a method for aseptic process sampling includes providing a flow of a process sample through a process sample path in a fluidic network. A first gas flow is provided through the process sample path after the flow of the process sample, a first solvent flow is provided through the sample path after the first gas flow, and a second gas flow is provided through the process sample after the first solvent flow.

The process sample path may include a filter and at least one valve channel.

A duration of each of the first and second gas flows and the first solvent flow through the process sample path may be predetermined.

A second solvent flow may be provided through the process sample path after the second gas flow. The second solvent flow may include one of a flow of a phosphate-buffered saline and a cell culture medium solution. A third gas flow may be provided through the sample process path after the second solvent flow.

A second solvent flow may be provided through the process sample path after the first solvent flow and before the second gas flow.

BRIEF DESCRIPTION OF THE DRAWINGS

The above and further advantages of this invention may be better understood by referring to the following description in conjunction with the accompanying drawings, in which like numerals indicate like structural elements and features in the various figures. For clarity, not every element may be labeled in every figure. The drawings are not necessarily to scale, emphasis instead being placed upon illustrating the principles of the invention.

DETAILED DESCRIPTION

Figure 1A:
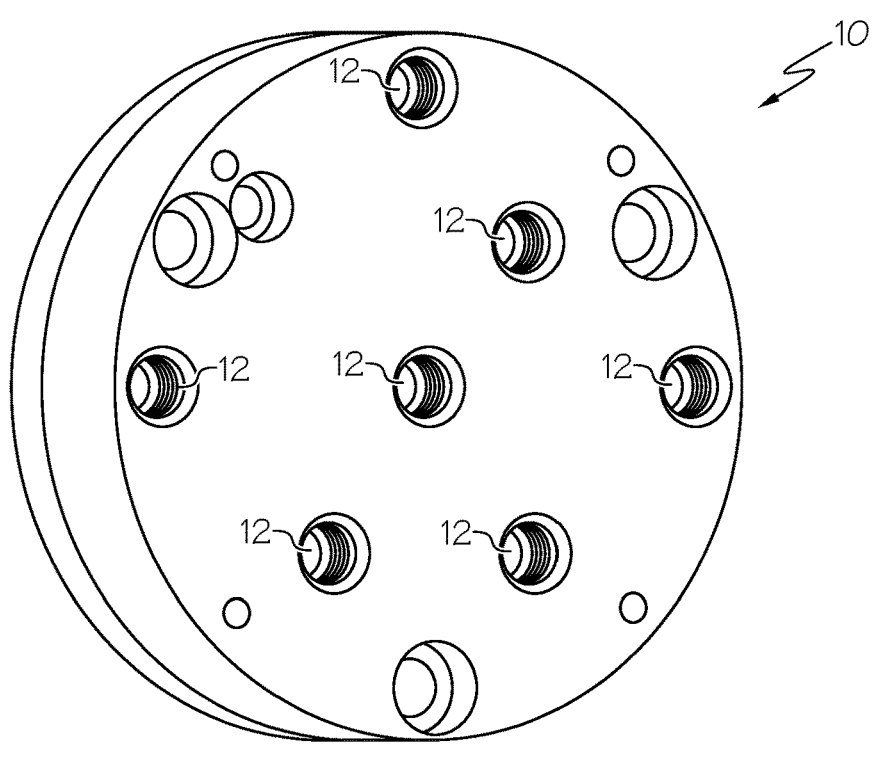
FIGS. 1A and 1B are illustrations showing a front side and a rear side, respectively, of a stator for a rotary shear seal valve that may be used as part of a fluidic network for aseptic process sampling.

Reference in the specification to an embodiment or example means that a particular feature, structure or characteristic described in connection with the embodiment or example is included in at least one embodiment or example of the teaching. References to a particular embodiment or example within the specification do not necessarily all refer to the same embodiment or example.

In brief overview, embodiments and examples disclosed herein are directed to a fluidic network that enables sample acquisition from a process source (e.g., a reactor, batch process, perfusion or flow) in an aseptic manner. The fluidic network includes a valve that isolates the valve port that receives the process sample (i.e., the "process inlet port") from all other valve ports except when the process sample flows through the valve. The fluidic network further includes a process outlet port that dispenses the process sample from the valve, for example, to a process sampler. After a process sample is acquired, any valve channels and external fluidic path that conducted the process sample are cleaned and dried before the valve is reconfigured to a valve state in which the valve channels are arranged to conduct another process sample received at the process inlet port. In this manner, the process inlet port is never connected to an unsanitized valve channel, thereby substantially reducing or eliminating the probability of introducing contamination into the reactor. Other elements in the process sample path, such as a filter to provide sample clarification, are similarly dried and washed. Drying and washing times may be programmed to ensure cleanliness between sample collections.

Advantageously, the ability to draw small volume process samples (e.g., a few hundred microliters or less) prevents loss of significant product generated by the bioprocess during process monitoring. This ability to acquire small volumes of process samples makes the fluidic network particularly suitable for small volume bioreactors. In addition, the lifetime of the filter is increased with a corresponding reduction in maintenance time and costs.

The present teaching will now be described in detail with reference to exemplary embodiments or examples thereof as shown in the accompanying drawings. While the present teaching is described in conjunction with various embodiments and examples, it is not intended that the present teaching be limited to such embodiments and examples. On the contrary, the present teaching encompasses various alternatives, modifications, and equivalents, as will be appreciated by those of skill in the art. Those of ordinary skill having access to the teaching herein will recognize additional implementations, modifications, and embodiments, as well as other fields of use, which are within the scope of the present disclosure as described herein.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "approximately" or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not put a limitation on the scope of the embodiments. No language in the specification should be construed as indicating any unclaimed element as essential to the practice of the embodiments.

Figure 1B:
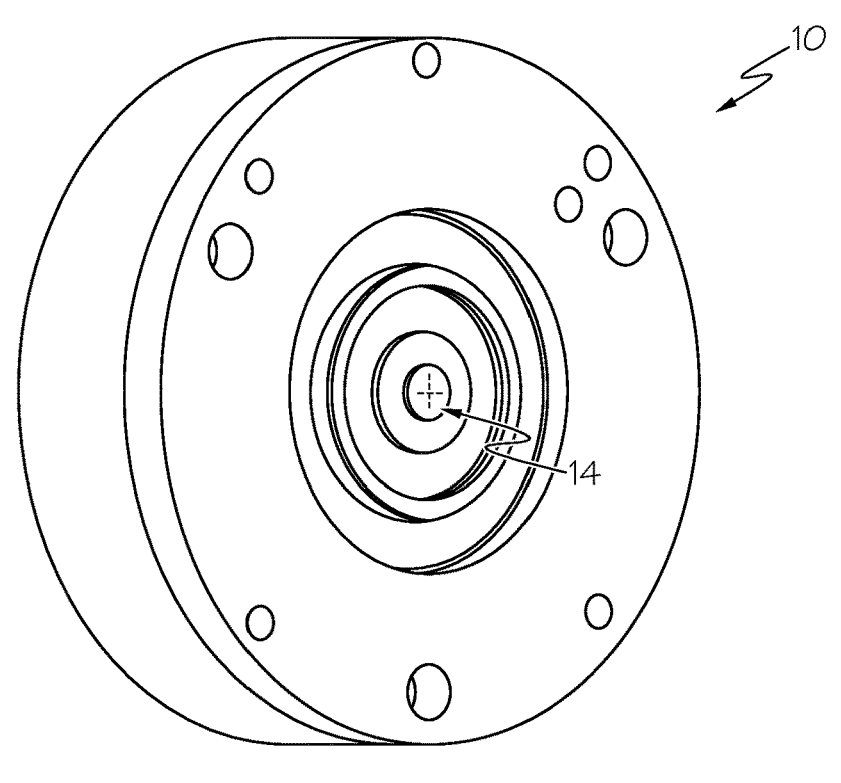

FIGS. 1A and 1B are illustrations showing a front side and a rear side, respectively, of a stator 10 for a rotary shear seal valve that may be used as part of a fluidic network for aseptic process sampling. The stator 10 includes seven external ports 12 that may be used to receive or discharge fluid flows. Each external port 12 is connected via an internal fluidic channel to a corresponding one of seven stator ports on the stator surface 14 which abuts the rotor surface (not shown) in the assembled valve. In one implementation, the stator is formed using a diffusion bonding process that enables efficient routing of the internal fluidic channels between the external ports 12 and the stator ports on the stator surface 14. Tubing may be coupled to an external port 12, for example, using a compression fitting, to allow fluid to pass into or out from the valve. In the examples of a fluidic network described below, one of the external ports 12 receives a process sample flow. Other external ports 12 may be used to pass the process sample flow to, or receive the process sample flow from, other components of the fluidic network (e.g., a filter) and external systems such as a process sampler module of an analytical system (e.g., a liquid chromatography system). The external ports 12 that pass the process sample flow are determined by internal valve channel configurations established by the valve state of the valve.

FIGS. 2A to 2D are schematic illustrations of an example of a fluidic network that may be used for aseptic sampling. For example, the fluidic network may be used to sample an ongoing bioprocess in a bioreactor. Reference is also made to FIG. 3 which is a flowchart representation of an example of a method 100 for aseptic process sampling. Sampling may occur in a repeated manner over a range of time, for example, to enable monitoring of a bioprocess from initiation to completion.

The fluidic network includes a sampling valve 20 and a manifold that supplies and controls a plurality of fluid flows. The manifold is shown implemented as a manifold valve 22 that couples to various fluid sources to provide and control a selected one of a gas flow, a first solvent flow and a second solvent flow at a manifold outlet port 30-4. In non-limiting alternative examples, the manifold may be implemented as a passive fluidic tee coupled to fluid lines each having an independent flow control device or a pressure regulator. As illustrated, the sampling valve 20 is a rotary shear seal valve that includes a rotor having a rotor surface and a stator having a stator surface that abuts the rotor surface. In alternative implementations, the sampling valve 20 may be a linear shear seal valve or other valve type configurable to provide similar functionality. Stator channels extend through the body of the stator to fluidically couple external valve ports to stator ports 24-1 to 24-7 (generally 24) on the stator surface. Tubing may be coupled to an external port using a compression fitting so that a fluid flow passes into or out from the corresponding stator channel and stator port 24. The rotor includes a plurality of valve channels 26-1 to 26-3 (generally 26) that are used to establish fluidic communication between the stator ports 24. In some embodiments, the valve channels 26 are microchannels formed as grooves on the rotor surface. Each valve channel 26 provides a flow path that can be used to fluidically couple two of the stator ports 24 according to a configuration of the sampling valve 20 in one of the valve states.

Figure 2A:
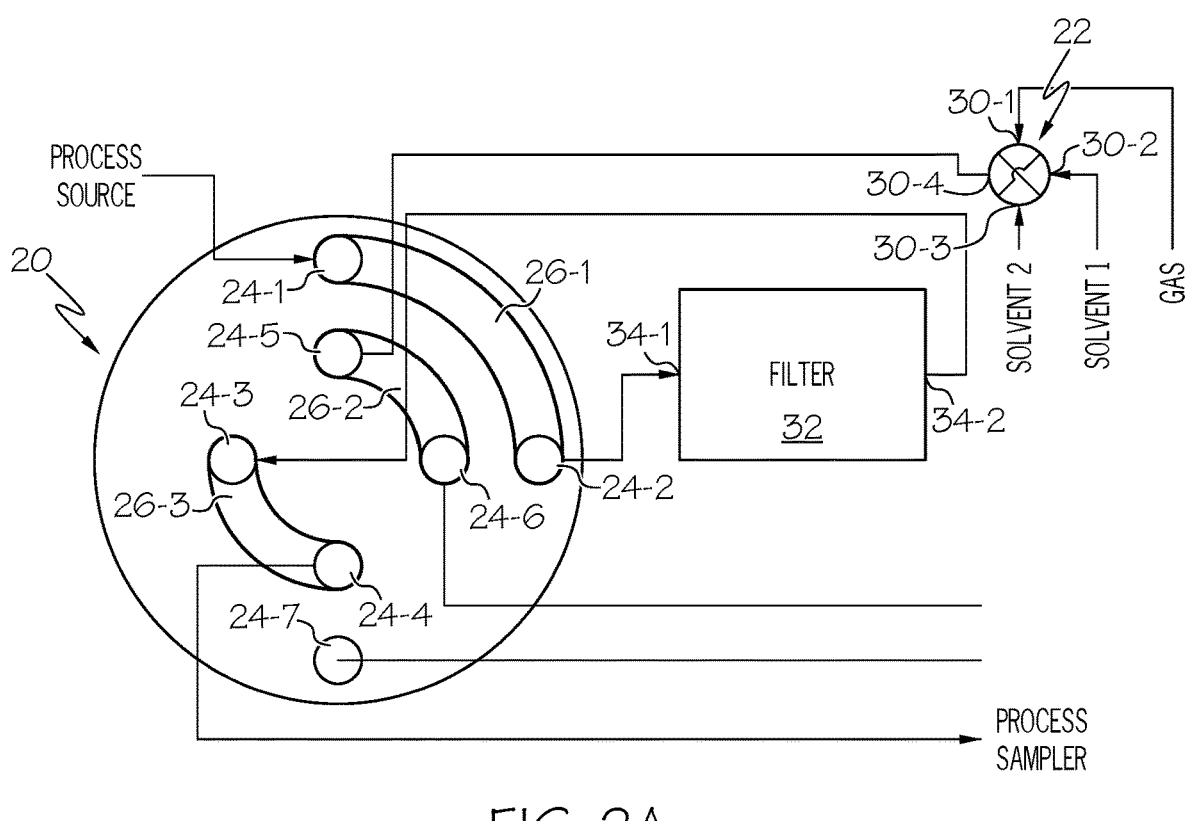
FIGS. 2A to 2D are schematic illustrations of an example of a fluidic network that may be used for aseptic process sampling where the figures show sequential configurations according to different valve states.
Figure 2B:
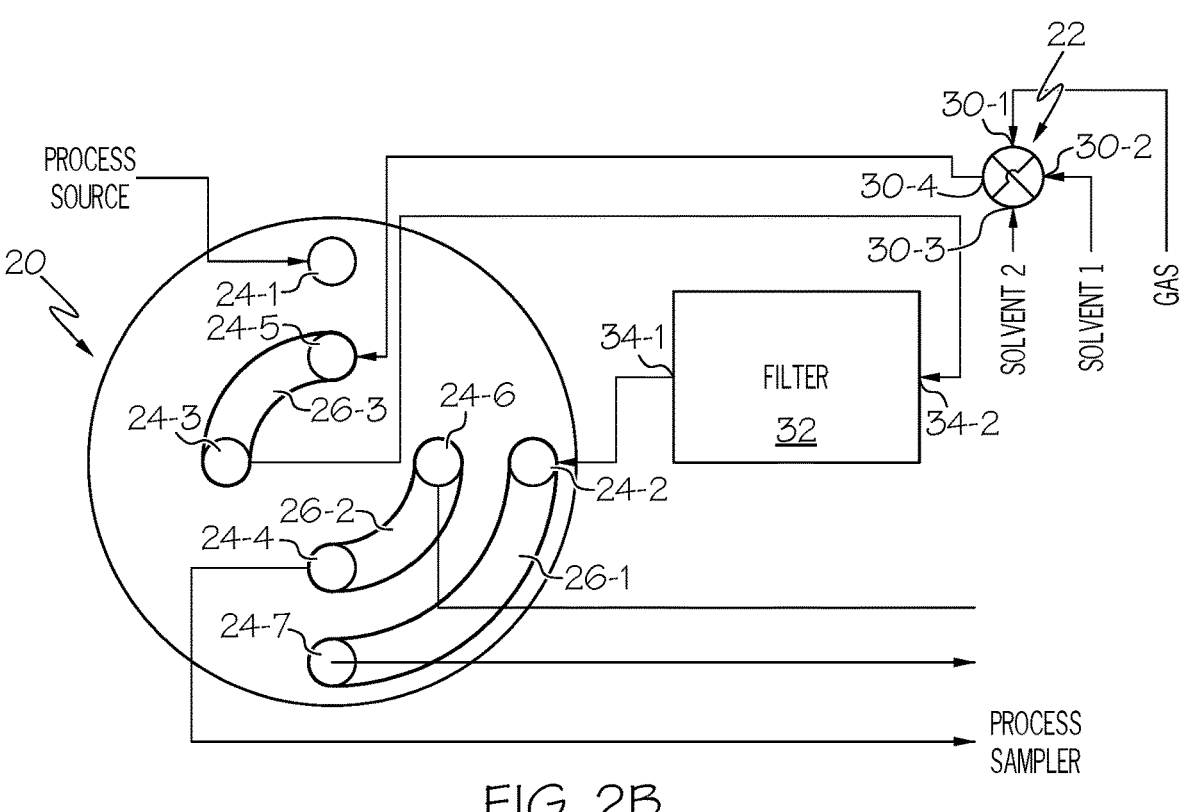
Figure 3:
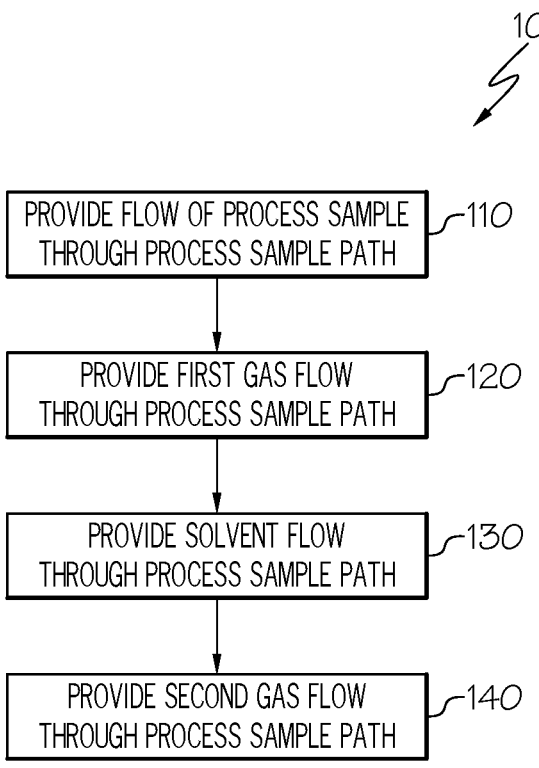
FIG. 3 is a flowchart representation of an example of a method for aseptic process sampling.

The sampling valve 20 changes valve state by rotating from a first valve state, as shown in FIG. 2A, to a second valve state, as shown in FIG. 2B, by clockwise rotation of the rotor by 90° with respect to the stator. Conversely, the sampling valve 20 may change from the second valve state to the first valve state by counterclockwise rotation of the rotor by 90° with respect to the stator.

The manifold valve 22 has a first inlet port 30-1 to receive a gas flow from a gas source, a second inlet port 30-2 to receive a first solvent flow, and a third inlet port 30-3 to receive a second solvent flow. For example, the inlet ports 30-1 to 30-3 may be coupled to sources of gas and solvent using compression fittings and tubing. The manifold valve 22 provides the selected gas or solvent flow at the manifold outlet port 30-4. The outlet port 30-4 is coupled to one of the external ports 12 of the sampling valve 20 with a compression fitting and tubing to provide the gas or solvent flow. By way of non-limiting examples, the manifold valve 22 may be a rotary shear seal valve or may be an arrangement of one or more solenoid valves.

The manifold valve 22 is configurable in three open valve states: a first valve state to pass the gas received at a first inlet port 30-1 to the manifold outlet port 30-4, a second valve state to pass the first solvent flow received at the second inlet port 30-2 to the manifold outlet port 30-4, a third valve state to pass the second solvent flow received at the third inlet port 30-3 to the manifold outlet port 30-4, and a closed valve state in which the three inlet ports 30-1 to 30-3 are fluidically decoupled from the outlet port 30-4 to prevent fluid from flowing from the manifold outlet port 30-4. In other embodiments, the number of inlet ports on the manifold valve 22 may be different. For example, there may be only two inlet ports, such as when only one solvent is utilized or there may be additional inlet ports if more solvents and/or gases are utilized.

The valve states of the two valves 20 and 22 are controlled by respective valve control signals. In some implementations, the valve control signals are provided by a valve control module. By way of example, the valve control module may be implemented using a standalone processor or as part of system processor. The valve control module may interface with a system controller and may be programmable via a user interface that also enables an operator to control other system parameters and functions, such as operation of a process sample source (e.g., a bioreactor) and/or an analytical instrument (e.g., a liquid chromatography system).

As used herein, the "process sample path" means a fluidic path in the fluidic network through which a process sample received at a process inlet port 24-1 flows before leaving the fluidic network at a process outlet port 24-4. In the illustrated examples described herein, the process sample path is defined by the fluidic path starting at the process inlet port 24-1. More specifically, the process sample path includes valve channel 26-1, filter 32 and valve channel 26-3.

According to the method 100 and with reference to FIG. 2A, a flow of a process sample received at the process inlet port 24-1 of the sampling valve 20 while in the first valve state is provided (step 110) through valve channel 26-1 and exits through port 24-2 before passing through a filter 32 having a filter inlet 34-1 and a filter outlet 34-2. The filter 32 removes undesired particulate matter and components from the flow of process sample. For example, an ongoing bioprocess may include material (e.g., cellular material) that can clog downstream components and analytical equipment. Such materials are removed from the process sample flow and collected by the filter 32. In some embodiments, the filter 32 is formed of a porous material having a pore size distribution selected to remove unwanted components of the process sample flow that exceed a predetermined size. The filtered process sample flow continues from the filter outlet 34-2 through valve channel 26-3 before exiting the sampling valve 20 at the process outlet port 24-4 and flowing to a process sampler. By way of a non-limiting example, the process sampler may include a syringe to draw a known volume of process sample from the flow exiting the sampling valve 20. The syringe can then be used to inject the acquired process sample into an analytical system. The remaining valve channel 26-2 is coupled at one end at stator port 24-5 to the manifold valve 22 or gas and at the other end at stator port 24-6. In the illustrated configuration, the manifold valve 22 preferably is maintained in the closed valve state; however, a flow of gas or solvent may be provided through valve channel 26-2 and expelled at port 24-6 if the manifold valve 22 is configured in one of its open valve states.

Subsequently, the sampling valve 20 is switched to its second valve state and the manifold valve 22 is configured in its first valve state, as shown in FIG. 2B. In this arrangement, the process sample source is disconnected at port 24-1 and is isolated from the other valve ports 24 and all valve channels 26. The sampling valve 20 then provides (step 120) a gas flow received from the manifold valve 22 at port 24-5 through the process sample path. More specifically, the gas flow passes through valve channel 26-3 and the filter 32 in a reverse direction, i.e., the gas flow enters the filter 32 at the filter outlet 34-2 and exits at the filter inlet 34-1. This gas backflush enables material collected by the filter 32 from the prior sample process flow to be removed from the filter 32 and expelled from the valve 20 by flowing through valve channel 26-1 before exiting at port 24-7. The gas flow also removes any liquid remaining in the valve channels 26-1 and 26-3. Non-limiting examples of gases that may be used include nitrogen, another one of the noble gases and oxygen. Independent to the backflush process, the previously acquired and filtered process sample may be managed by the process sampler and provided to an analytical system (e.g., a liquid chromatography system).

Figure 2C:
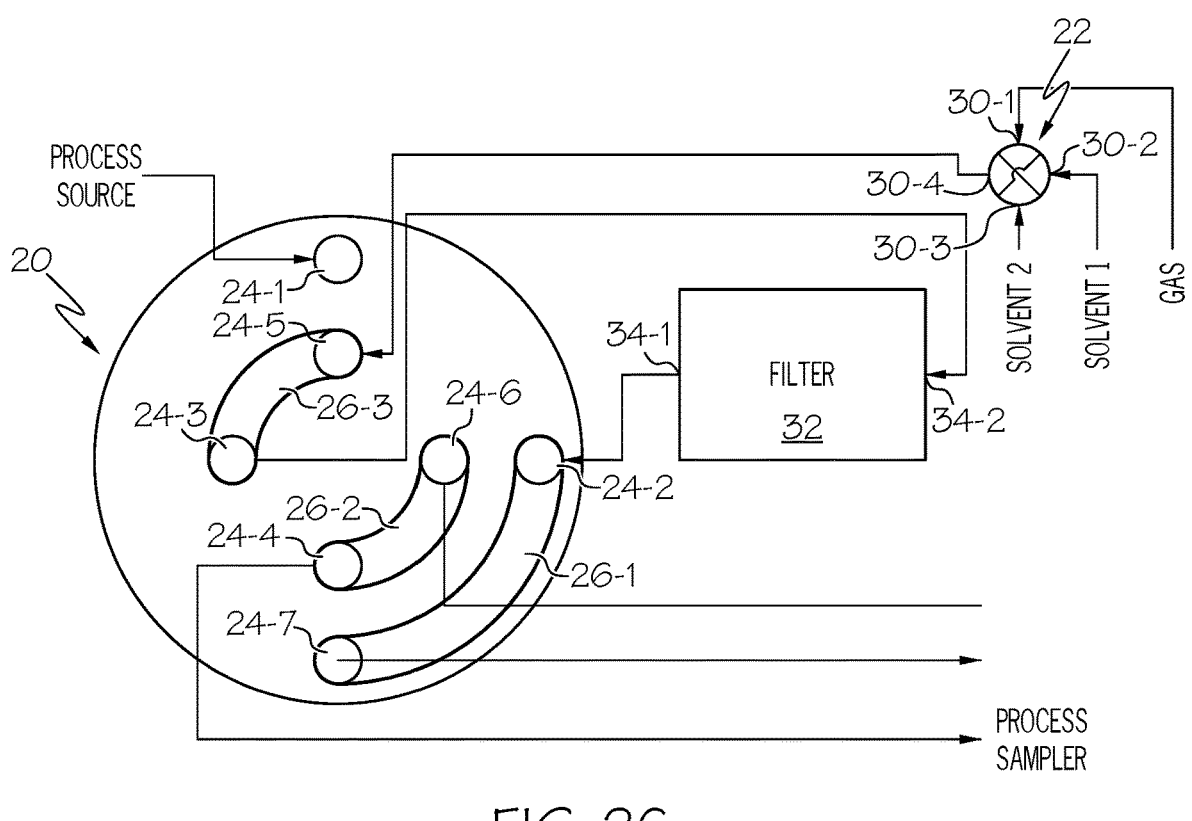
Figure 2D:
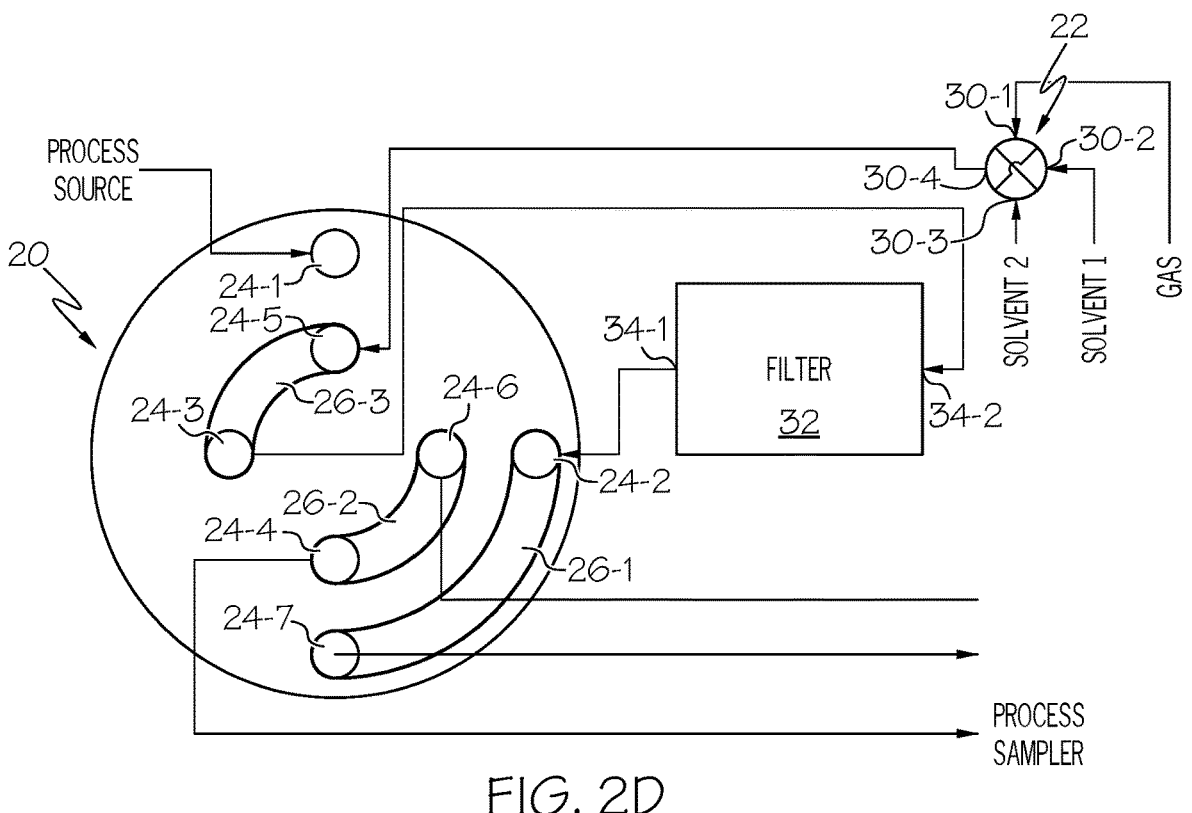

The manifold valve 22 is switched to its second valve state as shown in FIG. 2C to provide (step 130) a wash solvent flow through the process sample path similarly to the gas flow shown in FIG. 2B. The solvent flow assists in the removal of organic and other foreign material that may remain in the valve channels 26-1 and 26-3 and filter 32 after the gas backflush. For example, remaining foreign material may be dissolved into the solvent and dispensed from the sampling valve 20 to waste. Examples of a backflush solvent that may be used are a detergent or a liquid that may lyse and destroy cells within the process sample path and dissolve and carry away the cell membrane materials in the flow to waste. In alternative examples, the solvent is a phosphate-buffered saline (PBS) solution, a cell culture medium or other another liquid in which cellular material may be maintained in suspension and readily transported in a flow of the liquid. Subsequently, the manifold valve 22 is switched to its first valve state, as shown in FIG. 2D, to again provide (140) a gas flow to dry the valve channels 26-1 and 26-3 and filter 32.

The durations for the times when the gas and solvent flows pass through the process sample path can be independently controlled via the valve control module. For example, it may be desirable to provide a longer duration for the gas flow to pass through the process sample path in comparison for the period for the solvent flow to ensure sufficient or complete drying. The durations may be set to predetermined values.

In alternative embodiments, two or more solvents are used. Reference is again made to the components of the fluidic network as shown in FIGS. 2A to 2D and further to FIG. 4 which is a flowchart representation of another example of a method 200 for aseptic process sampling. A flow of the process sample is provided (step 210) through the process sample path, including valve channels 26-1 and 26-3 and filter 32, followed by providing (step 220) a first gas flow through the process sample path. Subsequently, a first solvent flow ("SOLVENT 1" at port 30-2) is provided (step 230) through the process sample path followed by providing (step 240) a second gas flow through the process sample path. A second solvent flow ("SOLVENT 2" at port 30-4) is then provided (step 250) before providing (step 260) a third gas flow. The gas flows are used to dry the process sample path so that no solvent remains. In one preferred method example, the first solvent is a detergent or another liquid that may destroy cells within the process sample path and the second solvent is a "weak solvent" (e.g., a phosphate-buffered saline (PBS) solution) that preserves and transports any cellular material that remained in the process sample path. In one variation of the method 200, the second solvent flow may be provided without the intervening second gas flow. In another alternative example of the method, the first solvent flow may be used both prior to and after the second solvent flow is used.

Figure 4:
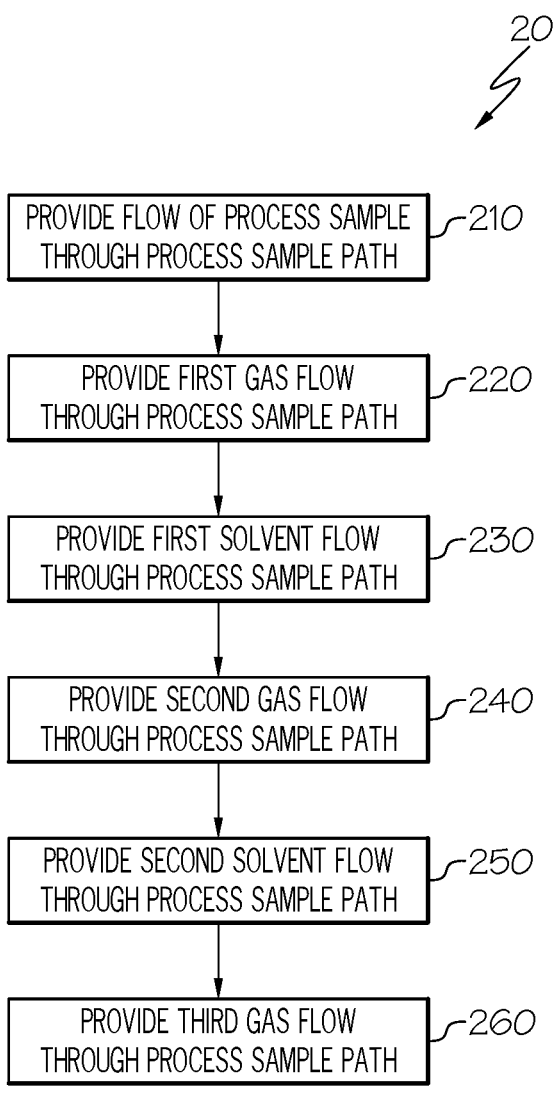
FIG. 4 is a flowchart representation of another example of a method for aseptic process sampling.

After completion of the method 100 or 200 according to FIGS. 3 and 4, respectively, it can be seen that all ports 24 and valve channels 26 in the process sample path and downstream from the process inlet port 24-1 have been sterilized and dried. Thus, the valves 20 and 22 may be reconfigured, for example, as shown in FIG. 2A, to enable acquisition of a subsequent process sample in an aseptic manner.

In the examples described above, the process sample path includes two valve channels and a filter that couples one of the valve channels to the other valve channel. It should be recognized that in other embodiments of the fluidic network the number and arrangement of valve channels and components in the process sample path may be different. In such embodiments, modifications to the fluidic network configurations described herein will be recognized by those of skill in the art to achieve solvent backwashing and gas backflushing of the process sample path in an analogous manner.

The fluidic network can be implemented using a rotary shear seal valve and solenoid valve; however, it should be recognized that in other embodiments, the fluidic network may be realized using other fluidic switching devices. For example, a linear shear seal valve may be used to achieve the same functional switching and fluidic path routing. The illustrated rotary shear seal valve 20 includes seven stator ports on a stator and three valve channels 26 that may be formed, for example, on a rotor surface; however, it will be recognized that other numbers of ports 24 and valve channels 26 are contemplated. Furthermore, the position of the ports 24 and the shapes and lengths of the valve channels 26 may be different from those described above. Moreover, the number of gas backflushes and solvent backwashes may be different from those described above.

While various examples have been shown and described, the description is intended to be exemplary, rather than limiting and it should be understood by those of ordinary skill in the art that various changes in form and detail may be made therein without departing from the scope of the invention as recited in the accompanying claims.

What is claimed is:

1. A fluidic network for aseptic process sampling, comprising:

a sampling valve having a plurality of ports and a plurality of valve channels and being configurable in at least a first valve state and a second valve state, wherein one of the ports is a process inlet port configured to receive a process sample, another one of the ports is a process outlet port configured to dispense the process sample;

a filter in fluidic communication with the sampling valve;

a manifold configured to supply and control the flows of a plurality of fluids, the manifold having a manifold outlet port to provide a flow of a selected one of the fluids, the manifold outlet port being in fluidic communication with one of the ports of the sampling valve; and a valve control module in communication with the sampling valve and the manifold, wherein, a process sample path is defined between the process inlet port and the process outlet port and includes the filter and at least one of the valve channels, wherein, when the sampling valve is in the first valve state, the process sample path is enabled to receive the process sample, wherein, when the sampling valve is in the second state, the flow of the selected one of the fluids from the manifold outlet ports is enabled to pass through the process sample path, and wherein, when the sampling valve is in the second state, the process inlet port is isolated from all of the other plurality of ports of the sampling valve.

2. The fluidic network of claim 1 wherein the manifold is controllable to provide a selected one of a solvent flow and a gas flow to the process sample path.

3. The fluidic network of claim 1 wherein the manifold comprises a manifold valve having a first inlet port configured to receive a gas flow and a second inlet port configured to receive a first solvent flow and wherein the manifold valve is configurable in a first valve state in which the gas flow is conducted from the first inlet port to the manifold outlet port, a second valve state in which the first solvent flow is conducted from the second inlet port to the manifold outlet port, and a closed valve state in which the first and second inlet ports are fluidically decoupled from the manifold outlet port.

4. The fluidic network of claim 2 wherein, when the sampling valve is in the second valve state and the manifold provides the gas flow, the gas flow is conducted through the process sample path and wherein, when the sampling valve is in the second valve state and the manifold provides the solvent flow, the solvent flow is conducted through the process sample path.

5. The fluidic network of claim 4 wherein the gas and solvent flows are in a reverse direction relative to a flow of the process sample through the process sample path.

6. The fluidic network of claim 2 wherein the valve control module is configured to adjust a period during which at least one of the gas flow and the solvent flow passes through the process sample path.

7. The fluidic network of claim 1 wherein the sampling valve is a rotary shear seal valve.

8. The fluidic network of claim 1 wherein the sampling valve is a linear shear seal valve.

9. The fluidic network of claim 1 wherein the filter is formed of a porous material.

10. A method for aseptic process sampling, the method comprising:

providing a fluidic network for aseptic process sampling including:

a sampling valve having a plurality of ports and a plurality of valve channels and being configurable in at least a first valve state and a second valve state, wherein one of the ports is a process inlet port configured to receive a process sample, another one of the ports is a process outlet port configured to dispense the process sample;

a filter in fluidic communication with the sampling valve;

a manifold configured to supply and control the flows of a plurality of fluids, the manifold having a manifold outlet port to provide a flow of a selected one of the fluids, the manifold outlet port being in fluidic communication with one of the ports of the sampling valve; and a valve control module in communication with the sampling valve and the manifold, wherein, a process sample path is defined between the process inlet port and the process outlet port and includes the filter and at least one of the valve channels, wherein, when the sampling valve is in the first valve state, the process sample path is enabled to receive the process sample and wherein, when the sampling valve is in the second state, the flow of the selected one of the fluids from the manifold outlet ports is enabled to pass through the process sample path;

providing a flow of the process sample through the process inlet port of the sampling valve and through the process sample path in the fluidic network;

providing a first gas flow through the process sample path after the flow of the process sample;

providing a first solvent flow through the process sample path after the first gas flow;

providing a second gas flow through the process sample path after the first solvent flow; and isolating the process inlet port of the sampling valve during the providing the first gas flow, the first solvent flow and the second gas flow.

11. The method of claim 10 further comprising providing a second solvent flow through the process sample path after the second gas flow.

12. The method of claim 11 wherein the second solvent flow comprises one of a flow of a phosphate-buffered saline and a cell culture medium solution.

13. The method of claim 11 further comprising providing a third gas flow through the process sample path after the second solvent flow.

14. The method of claim 10 further comprising providing a second solvent flow through the process sample path after the first solvent flow and before the second gas flow.

15. The method of claim 10 wherein a duration of each of the first and second gas flows and the first solvent flow through the process sample path are predetermined.

\* \* \* \* \*